March 21, 1933.  G. DE MONGE  1,902,323
CHAMBER OF VARIABLE VOLUME
Filed March 27, 1929
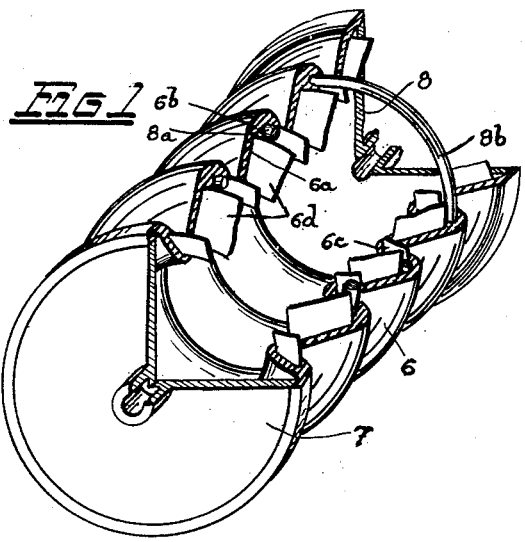
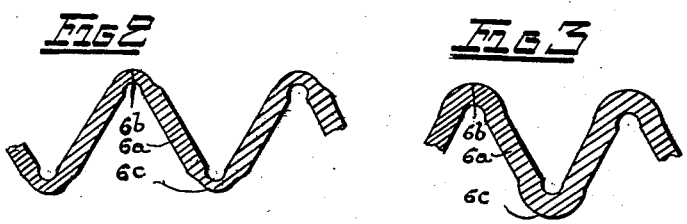
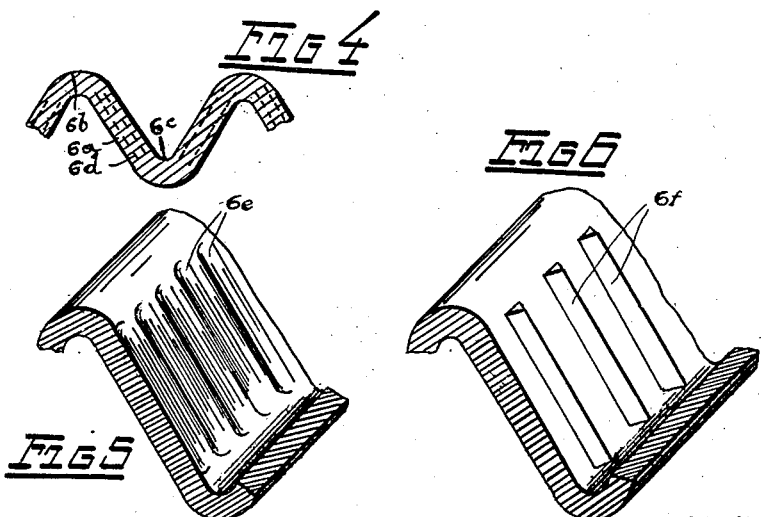
INVENTOR
G. de Monge,
BY
Langner, Parry, Card & Langner
ATTYS.

Patented Mar. 21, 1933

1,902,323

UNITED STATES PATENT OFFICE

GÉRARD DE MONGE, OF BRUSSELS, BELGIUM, ASSIGNOR TO FABRICA ITALIANA MAGNETI MARELLI, SOCIETA ANONIMA, OF MILAN, ITALY

CHAMBER OF VARIABLE VOLUME

Application filed March 27, 1929, Serial No. 350,426, and in Belgium April 2, 1928.

This invention relates to improvements in hollow chambers so constructed that the volume of the space enclosed thereby can be varied; and particularly to an improved type of bellows or the like made of flexible material so that portions thereof can have relative movement.

Such devices are well suited to respond to differences of pressure on the inside and outside thereof and thus perform mechanical work. The required difference of pressure can be generated by lowering the pressure of a suitable medium within the chamber, while at the same time keeping the pressure on the exterior thereof constant.

An object of this invention is to provide a chamber having the form of a bellows with the usual corrugations; but having the flat portions of the corrugations of greater strength and durability than the bends or edges of the corrugations.

Another object of the invention is to provide reenforcing elements or frames in the plane of the bends of larger diameter; so that collapsing of the bellows can be prevented when the pressure of the contents thereof is reduced.

Another object of the invention is to provide a bellows with corrugations or folds; the flat portions of which have a width which is equal to at least twice the thickness of the reenforcing frames aforesaid.

In the manufacture of the bellows according to this invention, any suitable material may be employed. It is preferable, however, to use rubber, because the bellows can then readily be made in a mold and the reenforcing members can be placed in the mold and embedded in the rubber in the operation of manufacturing the bellows.

The accompanying drawing shows by way of example, several embodiments of the invention. In said drawing, Figure 1 is a perspective view partly in section of a bellows constructed according to one form of the invention.

Figures 2 to 6 show in section several modifications.

Figure 1 shows a bellows of cylindrical shape which comprises a wall 6. The flat portions 6a of each fold or corrugation of the bellows are such that they have a greater strength, thickness, and rigidity than the bends or edge portions 6b and 6c. This strength of the flat portions will confine any deformations of the wall of the bellows, where it expands or contracts lengthwise, to the bends 6b and 6c, which will play the part of hinges when the end walls 7 and 8 of the chamber undergo relative displacement; the corrugated wall 6 being affixed to these ends 7 and 8.

Figure 2 is a section through the wall of a bellows in which the comparatively greater strength of the flat portions 6a is obtained by giving the material a greater thickness.

In the structure illustrated by Figure 3, the bends 6b and 6c are each formed as a segment of a circle, extending over a greater angle than 180°.

In the form shown by Figure 4, the flat portions 6a are provided with annular reenforcing elements 6d of dissimilar material, for instance of sheet metal or wire gauze or the like, embedded within the flat portions 6a. The same expedient may be used to strengthen the flat portions 6a of the bellows shown in Fig. 1.

Figures 5 and 6 show folds or corrugations reenforced by transverse grooves or ribs. The grooves are shown at 6e in Fig. 5 and the ribs at 6f in Fig. 6. Obviously the ribs and grooves of the adjacent flat portions of the folds can be staggered so as to permit these flat portions to be brought close together.

Figure 1 further presents at 8a rigid reenforcing frames mounted internally of the bends 6b. These frames have the shape of metal rings in one piece. As will be seen from the drawing, the width of the flat portions 6a of the folds of the bellows is considerably greater than the thickness of said rings. According to the invention, the flat portions must be at least twice as wide as the rings are thick. Similar frames or rings can be provided externally of the bellows at the bends 6c.

When the bellows are made of rubber or similar material, the reenforcing rings 8a and the reenforcing means 6c and 6d may be arranged in the mould used when the bellows is produced.

Obviously the corrugations of the bellows can be given a helical form, and then the metal rings 8a would also be helical.

While I have shown and described a practical form of my invention herein as having special structural characteristics, I reserve the right to make any changes that fall within the principle of the invention and do not exceed the scope and meaning of the appended claims.

What I claim is:

1. A chamber of variable volume comprising a corrugated bellows of rubber with reenforcing means embedded in the wall of said bellows between the bends thereof.

2. A chamber of variable volume having the form of a bellows of flexible material with circumferential corrugations, said material having substantial strength and thickness adjacent the bends of said corrugations, and reenforcing means embedded in said material between said bends.

3. A chamber of variable volume having the form of a bellows of flexible material with circumferential corrugations, said material having substantial strength and thickness at the bends of the corrugations and having annular sheet metal plates reenforcing said material between said bends.

4. A chamber of variable volume having the form of a bellows of flexible material with circumferential corrugations, said material being of substantial strength and thickness at the bends of the corrugations, and annular members of wire gauze reenforcing said material between said bends.

5. A chamber of variable volume having the form of a bellows of flexible material with circumferential corrugations, said bellows having annular reenforcing elements of different material firmly secured between said bends.

6. A chamber of variable volume in the form of a bellows of non-metallic material, said bellows having its portions between the bends thereof reenforced and having annular strengthening members adjacent the outermost of said bends.

In testimony whereof I affix my signature.

GÉRARD DE MONGE.